Patented Mar. 20, 1923.

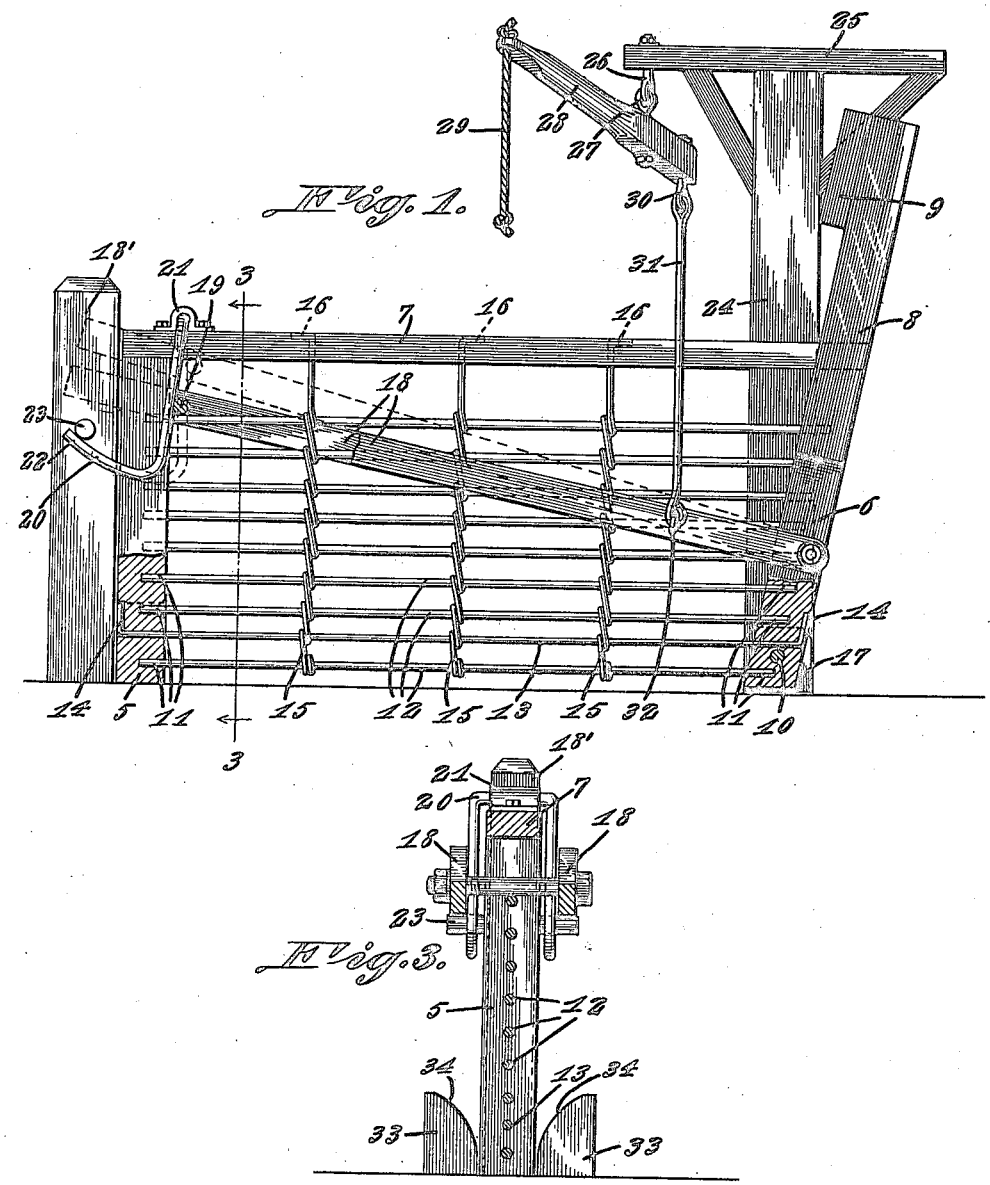

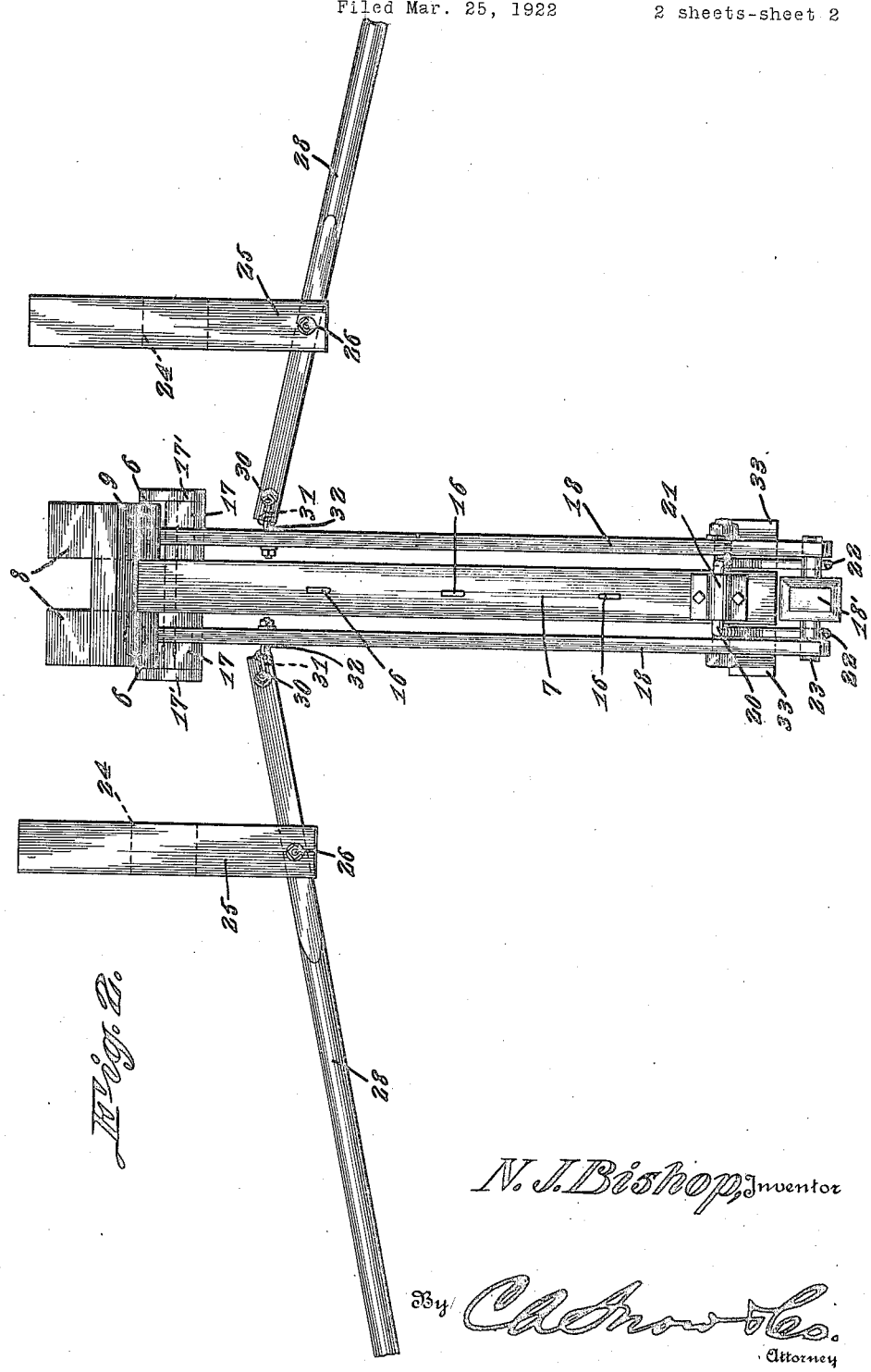

1,449,262

UNITED STATES PATENT OFFICE.

NEWTON J. BISHOP, OF WASHINGTON, DISTRICT OF COLUMBIA.

GATE.

Application filed March 25, 1922. Serial No. 546,621.

*To all whom it may concern:*

Be it known that I, NEWTON J. BISHOP, a citizen of the United States, residing in the city of Washington, in the District of Columbia, have invented a new and useful Gate, of which the following is a specification.

This invention relates to gates, and more particularly to gates operating on horizontal pivots.

The primary object of the invention is to provide a vertically swinging gate having a novel form of operating means, whereby the latch member will be automatically operated to release the gate from its keeper upon the movement of the lifting bars, to their lifting positions.

Another object of the invention is to provide means for accurately balancing the gate to insure the gate moving freely with the minimum amount of power.

A still further object of the invention is to provide a gate which will be braced throughout its entire structure, to eliminate any possibility of the gate sagging under the strain of the operating means.

Another object of the invention is to provide a latch mechanism which will be moved to its locking position automatically, when the lifting bars are returned to their normal or inactive positions.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of the gate, one of the supporting posts thereof being removed.

Figure 2 is a plan view of the gate.

Figure 3 is a sectional view taken on line 3—3 of Figure 1.

Spaced bars 8 form continuations of the bar 6, and carry the weight 9 at the upper ends thereof, the weight being designed to balance the gate proper and permit the gate to be operated with the minimum amount of power directed to the lifting bars thereof. As shown, the bar 6 as well as the bars 8 extend at an angle with respect to the bar 5 to throw the weight 9 to a point laterally of the pivot bar 10.

Formed in the inner surfaces of each of the bars 5 and 6 are openings adapted to accommodate the ends 11 of the rods 12, which form the body structure of the gate. Due to this construction, it will be seen that movement of the end bars 5 or 6 towards each other, is absolutely restricted.

The rod 13 which forms a part of the gate structure, is shown as having its ends extended through the bars 5 and 6 where they are turned upwardly as at 14, to closely engage the outer edges of the bars 5 and 6 and hold the bars 5 and 6 in position against movement away from each other.

The rods 12 and 13 are braced against movement with respect to each other, by means of the wires 15 that are shown as having their lower ends coiled around the lowermost rod 12, the intermediate portions thereof being looped around the remaining rods, while the extreme upper ends of the wires extend through openings in the bar 7, where the same are bent at right angles as at 16 to secure the wire against movement.

The pivot bar 10 is horizontally disposed and has its ends positioned in the supports 17 the extreme ends thereof, lying flush with the supports 17 where the same are covered by the boards 18 which prevent movement of the pivot bar 10 within the support 17 to insure against the same becoming displaced.

Pivotally connected to the end bar 6 are the spaced operating bars 18 which extend to the forward end of the gate, the extreme outer ends thereof terminating at points beyond the forward end of the gate as clearly shown by Figure 1 of the drawing, where the same embrace opposite sides of the gate post 18 to hold the gate against lateral movement when in a closed position.

These lifting bars 18 have pivotal connection with the bar 6 at a point in proximity to the pivot bar 10. A bar 19 connects the lifting bars 18 at a point adjacent to the outer end of the gate, the bar 19 being shown as operating between the uppermost rod 12 and the upper bar 7 of the gate so that a slight vertical movement of the lifting bars 18 is permitted with respect to the gate proper, for purposes to be hereinafter more fully described.

The latch member, forming an important feature of the gate is indicated at 20 and includes a rod bent intermediate its ends to straddle the upper bar 7 of the gate, where the same is pivotally connected thereto, as by means of the bearing member 21. The ends of the rod 20 are bent outwardly as at 22 where the same may engage under the keeper 23 which is in the form of a horizontally disposed rod extended through the gate post 18, the ends thereof extending beyond the side walls of the gate post to lie within the path of travel of the portions 22 of the latch and restrict movement of the gate proper. Thus it will be seen that due to the construction of the latch member, the same will fall by gravity to a position as illustrated by dotted lines in Figure 1 of the drawings, but when the bar 19 moves downwardly by gravity, it is obvious that the latch member is moved into engagement with the keeper 23 to lock the gate against movement.

Uprights 24 are supported on opposite sides of the gate and in spaced relation therewith, cross bars 25 being mounted on the upper ends of the uprights 24, where the same support the eye bolts 26, which in turn have connection with the eye bolts 27 carried by the operating arms 28. These operating arms 28 are disposed at angles with respect to the uprights 24, so that the free ends thereof lie in planes above the road surface, and at points substantially intermediate the sides thereof, so that the ropes 29, which are carried thereby will hang in positions to be conveniently grasped by a person passing under the gate to operate the arms 28.

Eye bolts 30 are carried by the arms 28 at points adjacent to the inner ends thereof, which eye bolts receive the upper ends of the connecting rods 31, the lower ends thereof being secured to the eye bolts 32 carried by the lifting bars 18. The eyebolts 32 are disposed at points adjacent to the inner ends of the lifting bars and at a point laterally of the pivot bar 10 to increase the leverage of the connecting rods 31 to the end that the gate may be easily operated.

In the operation of the device, assuming that the gate is in its closed position, and it is desired to open the same, the rope 29 is pulled to the end that the arm 28 associated with the rope is rocked, moving the connecting rod 31 connected thereto, upwardly. This upward movement is transmitted to the lifting bars 18, which move upwardly until the bar 19 contacts with the under side of the bar 17 of the gate. It will be seen that upon further movement of the rod 31, the gate is pivoted upwardly to its open position, the weight 9 acting as a counterbalance to cause the gate to move readily.

It might be further stated that upon the upward movement of the lifting bars 18, the latch member is released from under the keeper 23 to permit of such upward movement of the gate.

When it is desired to return the gate to its closed position, the arm is again pulled overbalancing the gate and moving the same to its closed position, the weight 9 being supported at an angle, having a tendency to retard the movement of the gate to its closed position.

With the gate in its closed position, the arm 28 will be released, the weight of the lifting bars causing the latch member to move under the keeper 23 to lock the gate in its closed position.

In order that the gate will be moved into direct alignment with the gate post 18, blocks 33 are provided, which blocks have opposed camming surfaces 34 disposed in spaced relation, the space between the camming surfaces being equal to the width of the end bar 5 of the gate, thereby guiding the gate to its proper position when the gate falls therebetween.

Having thus described the invention what is claimed as new is:—

1. In a vertically swinging gate, supports, a pivot bar mounted on the supports, a gate embodying end bars and an upper bar, horizontal rods having connection with the end bars, a pair of lifting bars, the bars being disposed on opposite sides of the gate and connected by a bar, said bar adapted to move into engagement with the upper bar of the gate to transmit movement of the lifting bars to the gate, a swinging latch member adapted to normally engage the last mentioned bar to prevent movement of the latch member, said latch member adapted to move by gravity to unlock the gate when the lifting bars move upwardly, and means for operating the lifting bars.

2. In a vertically swinging gate, a horizontal pivot bar, a gate pivotally mounted on the pivot bar, a latch member including a pair of arms extending downwardly from the upper portion of the gate and having outwardly extended portions, a gate stop post carrying a keeper, lifting bars on the gate and adapted to engage the arms of the latch member to force the outwardly extended portions thereof under the keeper, said latch member adapted to move to its inactive position when the lifting bars move upwardly, and means having connection with the lifting bars for moving the same to operate the gate.

3. In a vertically swinging gate, a pivot bar, a gate supported on the pivot bar to swing vertically, lifting bars having pivotal connection with the gate adjacent to the pivot bar on which the gate is mounted, the upper ends of the lifting bars extending beyond one end of the gate to embrace portions of a stop post, a latch member adapted to engage the stop post to lock the gate against movement, means for guiding the gate into alignment with the stop post, and means for moving the lifting bars to move the gate.

4. In a vertically swinging gate, a horizontal pivot bar, a gate pivotally mounted on the pivot bar, a latch member carried by the gate, a gate stop post carrying a keeper, lifting bars on the gate, said lifting bars having their outer ends normally embracing portions of the gate stop post to hold the gate against lateral movement, a bar connecting the lifting bars, said connecting bar adapted to engage the latch member to normally hold the latch member into engagement with the keeper, and means having connection with the lifting bars for moving the same to operate the gate.

5. In a vertically swinging gate, a horizontal pivot bar, a gate pivotally mounted on the pivot bar, said gate including end bars and an upper bar, rods connecting the end bars, one of said rods having its ends extended through the end bars and bent upwardly into close engagement with the end bars, a latch member carried by the gate, a stop post, a keeper on the stop post and cooperating with the latch member to secure the gate against movement, lifting bars pivotally mounted on the gate, means carried by the lifting bars to engage the latch member for automatically controlling the movements of the latch member when the gate is operated, and means for operating the lifting bars.

In testimony that I claim the foregoing as my own, I have hereto affixed my signature in the presence of two witnesses.

NEWTON J. BISHOP.

Witnesses:
   IVY E. SIMPSON,
   AGNES ROCKELLI.